US009703691B1

(12) United States Patent
Yim et al.

(10) Patent No.: US 9,703,691 B1
(45) Date of Patent: Jul. 11, 2017

(54) TESTING APPLICATION SOFTWARE USING VIRTUAL OR PHYSICAL DEVICES

(71) Applicant: Google Inc., Mountain View, CA (US)

(72) Inventors: Keun Soo Yim, Sunnyvale, CA (US); Pratyus Patnaik, San Francisco, CA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 14/739,292

(22) Filed: Jun. 15, 2015

(51) Int. Cl.
G06F 11/36 (2006.01)

(52) U.S. Cl.
CPC ...... *G06F 11/3688* (2013.01); *G06F 11/3664* (2013.01); *G06F 11/3668* (2013.01); *G06F 11/3684* (2013.01)

(58) Field of Classification Search
CPC .................. G06F 11/3668; G06F 11/3664
See application file for complete search history.

(56) References Cited

U.S. PATENT DOCUMENTS

| 8,467,987 | B1 | 6/2013 | Davidson et al. |
| 8,620,305 | B2 | 12/2013 | Singh et al. |
| 8,719,776 | B2 | 5/2014 | Eteminan et al. |
| 8,737,980 | B2 | 5/2014 | Doshi et al. |
| 8,819,495 | B2 | 8/2014 | Martin |
| 8,856,748 | B1* | 10/2014 | Larsen ................ G06F 11/3668 717/125 |
| 8,930,766 | B2 | 1/2015 | Griesinger et al. |
| 8,930,917 | B2 | 1/2015 | Mittal et al. |
| 8,978,014 | B1 | 3/2015 | Larsen et al. |
| 2009/0177567 | A1 | 7/2009 | McKerlich et al. |
| 2009/0254887 | A1* | 10/2009 | Rossi ................. G06F 11/3688 717/126 |
| 2009/0307530 | A1* | 12/2009 | Tarta ................. G06F 11/3668 714/38.14 |
| 2010/0003923 | A1 | 1/2010 | McKerlich et al. |
| 2010/0251204 | A1* | 9/2010 | Peterson ............... G06Q 30/02 717/102 |
| 2011/0161912 | A1 | 6/2011 | Eteminan et al. |
| 2011/0320879 | A1 | 12/2011 | Singh et al. |
| 2012/0253728 | A1* | 10/2012 | Chamas ............. G06F 11/2294 702/109 |
| 2012/0253745 | A1 | 10/2012 | Dhanapal et al. |
| 2013/0078983 | A1 | 3/2013 | Doshi et al. |
| 2013/0179858 | A1 | 7/2013 | Mecke et al. |
| 2013/0318498 | A1 | 11/2013 | Mittal et al. |

(Continued)

FOREIGN PATENT DOCUMENTS

| CN | 101521899 A | 9/2009 |
| CN | 102681935 A | 9/2012 |

(Continued)

*Primary Examiner* — Yolanda L Wilson
(74) *Attorney, Agent, or Firm* — Honigman Miller Schwartz and Cohn LLP

(57) ABSTRACT

A method includes receiving an application package for a software application and determining a test compatibility of the software application on virtual devices and on physical devices based on the application package. The method further includes selecting a test device based on the test compatibility of the software application. The test device includes one of a test virtual device or a test physical device. The method routes the software application to the test device and executes the software application on the test device.

28 Claims, 11 Drawing Sheets

(56) References Cited

U.S. PATENT DOCUMENTS

| | | |
|---|---|---|
| 2014/0095933 A1 | 4/2014 | Griesinger et al. |
| 2014/0165046 A1* | 6/2014 | Lee .................... G06F 11/3668 717/135 |
| 2014/0237451 A1 | 8/2014 | Koneru et al. |
| 2014/0357250 A1 | 12/2014 | Nitsan et al. |
| 2014/0380278 A1* | 12/2014 | Dayan ................ G06F 11/3692 717/124 |
| 2015/0026522 A1 | 1/2015 | Young et al. |
| 2015/0067868 A1 | 3/2015 | Kim et al. |
| 2015/0082282 A1 | 3/2015 | Larsen et al. |
| 2015/0242294 A1* | 8/2015 | Lapierre ............. G06F 11/2294 714/37 |
| 2015/0269062 A1* | 9/2015 | Sharda ................ G06F 11/3664 714/38.1 |
| 2015/0317235 A1* | 11/2015 | Lachambre ......... G06F 11/3668 717/126 |
| 2015/0339216 A1* | 11/2015 | Wade .................. G06F 11/3688 714/38.1 |

FOREIGN PATENT DOCUMENTS

| | | |
|---|---|---|
| CN | 102681942 A | 9/2012 |
| CN | 102708048 A | 10/2012 |
| CN | 102708049 A | 10/2012 |
| CN | 102708050 A | 10/2012 |
| CN | 102710456 A | 10/2012 |
| CN | 102710832 A | 10/2012 |
| CN | 202799166 U | 3/2013 |
| CN | 104156308 A | 11/2014 |
| EP | 2241100 A1 | 10/2010 |
| EP | 2615555 A1 | 7/2013 |
| EP | 2812805 A1 | 12/2014 |
| WO | WO-2009089374 A1 | 7/2009 |
| WO | WO-2013119205 A1 | 8/2013 |
| WO | WO-2015073046 A1 | 5/2015 |

\* cited by examiner

TESTING APPLICATION SOFTWARE USING VIRTUAL OR PHYSICAL DEVICES

TECHNICAL FIELD

This disclosure relates to testing mobile software using virtual or physical devices.

BACKGROUND

Developers generally test software applications using testing suites executing on a local physical device or a remote system. The software applications may execute on virtual devices capable of emulating physical devices having device hardware compatible with device hardware requirements of the software application. Executing the software application on the virtual devices provides the developer with a low cost procedure for testing the functionality and performance of the software application. Virtual devices, however, may not always exhibit perfect fidelity when executing the software application compared to physical devices executing the software application, for example, due to variances in timing to execute the software application. These variances in timing may relate to the virtual devices not properly executing the software application, and therefore, not providing the best data associated with the software application during a test. Moreover, testing suites require the developer to select a particular target device for testing the software application. Often, the developer does not have the necessary level of sophistication to choose the particular target device that is most suitable for executing the software application during a test.

SUMMARY

One aspect of the disclosure provides a method for testing mobile software services using virtual devices. The method includes receiving, at data processing hardware, an application package for a software application and determining, by the data processing hardware, a test compatibility of the software application on virtual devices and on physical devices based on the application package. The method also includes selecting, by the data processing hardware, a test device based on the test compatibility of the software application, routing the software application to the test device, and executing the software application on the test device. The test device includes one of a test virtual device or a test physical device.

Implementations of the disclosure may include one or more of the following optional features. In some implementations, selecting the test device is based on one or more permissions associated with the software application. When the virtual devices are incapable of emulating at least one of the one or more permissions associated with the software application, the method may include selecting, by the data processing hardware, the test physical device as the test device. In some examples, selecting the test device is based on a history of test devices previously selected for executing the software application. Selecting the test device may further be based on a cost to test the software application on the virtual devices and a cost to test the software application on the physical devices. Optionally, selecting the test device may be based on one or more instruction set architectures compiled tier the software application.

In some examples, the method includes extracting, by the data processing hardware, a manifest file from the application package, determining, by the data processing hardware, attributes of the software application and determining, by the data processing hardware, the test compatibility of the software application based on the attributes of the software application. The attributes may include at least one of build information, operating locality information, device hardware requirements, or device software requirements. In some examples, determining the test compatibility of the software application includes determining, by the data processing hardware, software libraries associated with the software application and determining, by the data processing hardware, one or more features and/or one or more permissions associated with the software application based on the software libraries.

In some implementations, when the software application is compatible for testing on the virtual devices, the method includes selecting the test virtual device from a collection of the virtual devices. The test virtual device may emulate a physical device having device hardware compatible with device hardware requirements of the software application. When the software application is compatible for testing on physical devices, the method may include selecting a test physical device from a collection of physical devices. The test physical device may have device hardware compatible with the device hardware requirements.

Selecting the test device may further include receiving, at the data processing hardware, a test request from a user device to test the software application on a target device and determining, at the data processing hardware, whether the software application is incompatible for testing on the target device based on the device type. The target device may include a device type associated with the virtual devices or the physical devices. In some implementations, when the software application is incompatible for testing on the target device, the method includes selecting the test device from a collection of test devices associated with a device type different than the device type of the target device. The test device may have device hardware compatible with device hardware requirements of the software application. When the software application is compatible for testing on the device type associated with the target device, the method may include selecting the test device from a collection of test devices associated with the same device type as the target device. The test device may have device hardware compatible with device hardware requirements of the software application.

In some examples, when the test physical device is selected as the test device and after executing the software application on the test device, and when the software application is compatible for testing on the virtual devices, the method includes re-routing the software application to the test virtual device, executing the software application on the test virtual device, and comparing, by the data processing hardware, test parameters associated with the executing of the software application on the test virtual device and on the test physical device. When the test virtual device properly tests the software application based on the comparing of the test parameters, the method may include selecting, by the data processing hardware, the test virtual device as the test device for a subsequent test of the software application.

In some implementations, when the test virtual device is selected as the test device and after executing the software application on the test device, and when the software application is compatible for testing on the physical devices, the method includes re-routing the software application to the test physical device and executing the software application on the test physical device. In some examples, the method further includes determining, by the data processing hardware, reliability information associated with executing the software application on the test physical device and storing the reliability information in memory hardware in communication with the data processing hardware for use during subsequent compatibility testing of the software application.

In some examples, the method includes transmitting a testing inquiry from the data processing hardware to a user device in communication with the data processing hardware after receiving the application package for the software application. The testing inquiry causes a user interface executing on the user device to display an interactive graphic configured to receive a user selection. The interactive graphic may include at least one of an automatic device type selection that enables the data processing hardware to select either one of the test virtual device or the test physical device based on the test compatibility; or a user requested device type selection that permits the user device to request the data processing hardware to test the software application on a target test device, the target test device comprising a virtual device type or a physical device type. The physical devices may include at least one of desktop computers, laptops, tablets, smart phones, and wearable computing devices.

Another aspect of the disclosure provides a system including data processing hardware and memory hardware in communication with the data processing hardware. The memory hardware stores instructions that when executed on the data processing hardware cause the data processing hardware to perform operations including receiving an application package for a software application, determining a test compatibility of the software application, selecting a test device, routing the software application to the test device, and causing execution of the software application on the test device. The data processing hardware determines the test compatibility of the software application on test virtual devices and on physical devices based on the application package. The data processing hardware selects the test device based on the test compatibility of the application. The test device includes one of a test virtual device or a test physical device.

This aspect may include one or more of the following optional features. At the one or more device selector processing devices, the system selects the test device based on one or more permissions associated with one or more features required by the software application. At the one or more device selector processing devices, when the virtual devices are incapable of emulating at least one of the one or more permissions associated with the one or more features required by the software application, the system selects the test physical device as the test device. At the one or more device selector processing devices, the system selects the test device based on a history of test devices previously selected for executing the software application. At the one or more device selector processing devices, the system selects the test device based on a cost to test the software application on the virtual devices and a cost to test the software application on the physical devices. At the one or more device selector processing devices, the device selector further selects the test device based on one or more instruction set architectures compiled for producing at least a portion of the software application.

This aspect may include one or more of the following optional features. In some implementations, the data processing hardware selects the test device based on one or more permissions associated with one or more features required by the software application. The data processing hardware may select, when the virtual devices are incapable of emulating at least one of the one or more permissions associated with the one or more features required by the software application, the test physical device as the test device. Optionally, the data processing hardware selects the test device based on a history of test devices previously selected for executing the software application. In some implementations, the data processing hardware selects the test device based on a cost to test the software application on the virtual devices and a cost to test the software application on the physical devices. Additionally or alternatively, the data processing hardware may select the test device based on one or more instruction set architectures compiled for producing at least a portion of the software application.

In some examples, the data processing hardware extracts a manifest file from the application package, determines attributes of the software application and determines the test compatibility of the software application based on the attributes of the software application. In these examples, the attributes include at least one of build information, operating locality information, device hardware requirements, or device software requirements. In some examples, when determining the test compatibility of the software application, the data processing hardware determines software libraries associated with the software application and determines one or more features and/or one or more permissions associated with the software application based on the software libraries. In some examples, when the software application is compatible for testing on the virtual devices, the data processing hardware selects the test virtual device from a collection of the virtual devices. Here, the test virtual device may emulate a physical device having device hardware compatible with device hardware requirements of the software application. In some examples, the software application is compatible for testing on physical devices, the data processing hardware selects a test physical device from a collection of the physical devices. Here, the test physical device may have device hardware compatible with the device hardware requirements.

In some implementations, when selecting the test device, the data processing hardware receives a test request from a user device to test the software application on a target device and determines whether the software application is incompatible for testing on the target device based on the device type. The target device may include a device type associated with the virtual devices or the physical devices. In some examples, the data processing hardware selects, when the software application is incompatible for testing on the target device, the test device from a collection of test devices associated with a device type different than the device type of the target device. The test device may have device hardware compatible with device hardware requirements of the software application. Optionally, the data processing hardware selects, when the software application is compatible for testing on the device type associated with the target device, the test device from a collection of test devices associated with the same device type as the target device. The test device may have device hardware compatible with device hardware requirements of the software application.

In some examples, when the software application is compatible for testing on the virtual devices, at the one or more device selector processing devices, the data processing hardware re-routes the software application to the test virtual device, executes the software application on the test virtual device, and compares testing parameters associated with the executing of the software application on the test virtual device and on the test physical device. In some implementations, the data processing hardware selects, when the test virtual device properly tests the software application based on the comparing of the testing parameters, the test virtual device as the test device for a subsequent test of the software application.

In some implementations, when the test virtual device is selected as the test device and after executing the software application on the test device, and when the software application is compatible for testing on the physical devices, the data processing hardware re-routes the software application to the test physical device and executes the software application on the test physical device. The data processing hardware may also determine reliability information associated with executing the software application on the test physical device and store the reliability information in the memory hardware in communication with the data processing hardware for use during subsequent compatibility testing of the software application.

In some implementations, the data processing hardware transmits a testing inquiry to a user device in communication with the data processing hardware after receiving the application package for the software application. In these implementations, the testing inquiry causes a user interface executing on the user device to display an interactive graphic configured to receive a user selection. The interactive graphic may include at least one of an automatic device type selection that enables the device selector to select either one of the test virtual device or the test physical device based on the test compatibility; or a user requested device type selection that permits the user device to request the testing application program interface to test the software application on a target device. The target device may include a virtual device type or a physical device type. In some implementations, the data processing hardware determines, when determining the test compatibility of the software application on the virtual devices and on the physical devices. The test compatibility of the software application on the physical devices may include at least one of desktop computers, laptops, tablets, smart phones, and wearable computing devices.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
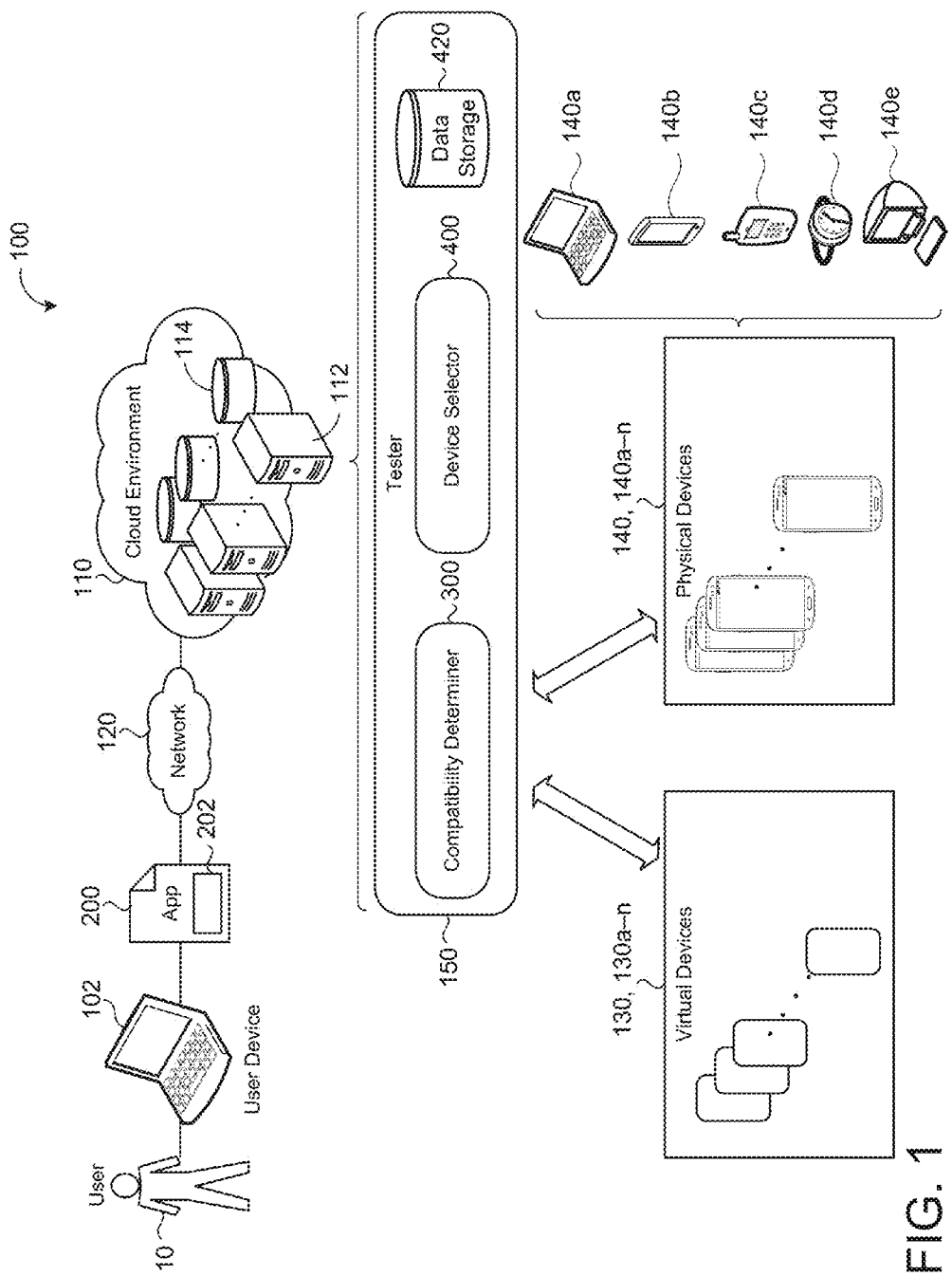
FIG. 1 is a schematic view of an example system for determining test compatibility of a software application on virtual devices and on physical devices.

Referring to FIG. 1, in some implementations, an example system 100 includes a user device 102 associated with a user 10 in communication with a remote system 110 via a network 120. The remote system 110 may be a distributed system (e.g., a cloud environment) having scalable/elastic computing resources 112 (e.g., data processing hardware) and/or storage resources 114. In some implementations, computing resources 112 of the remote system 110 execute an application tester 150 that receives an application package 202 for a software application 200 (hereinafter application) from the user device 102. For example, the user 10 may correspond to a developer using the user device 102 to upload the application package 202 to the application tester 150 for testing performance and/or functionality of the application 200. In some implementations, the application 200 corresponds to a mobile application 200. In some examples, the remote system 110 system communicates with data storage hardware 420.

In some implementations, the application tester 150 of the data processing hardware 112 implements a compatibility determiner 300 that determines a test compatibility of the application 200 on virtual devices 130 and on physical devices 140 based on the application package 202. Additionally, the application tester 150 may implement a device selector 400 that selects a particular test device 450, 450a-b (FIG. 4A) based on the test compatibility of the application 200. In some examples, the test device 450 includes a test virtual device 450a from a collection of virtual devices 130a-n or a test physical device 450b from a collection of physical devices 140a-n. In some examples, the device selector 400 routes the application 200 to the test device 450 for executing the application 200.

The network 120 may include various types of networks, such as local area network (IAN), wide area network (WAN), and/or the Internet. Although the network 120 may represent a long range network (e.g., Internet or WAN), in some implementations, the network 120 includes a shorter range network, such as a local area network (LAN). In some implementations, the network 120 uses standard communications technologies and/or protocols. Thus, the network 120 can include links using technologies, such as Ethernet, Wireless Fidelity (WiFi) (e.g., 802.11), worldwide interoperability for microwave access (WiMAX), 3G, Long Term Evolution (LTE), subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 120 uses custom and/or dedicated data communications technologies instead of, or in addition to, the ones described above.

The physical devices 140a-n include, but are not limited to, laptops 140a, tablets 140b, smart phones 140c, wearable computing devices 140d (e.g., headsets and/or watches), or desktop computers 140e. Conversely, the virtual devices 130a-n may emulate mobile devices having device hardware compatible with mobile device hardware requirements associated with the application 200. In some implementations, the data processing hardware 112 obtains the mobile device hardware requirements from the application package 202.

The application package 202 may include a package file format for executing the application 200 on a variety of different operating systems. For example, the application 200 may execute on an operating system including, but not limited to, ANDROID® developed by Google Inc., IOS® developed by Apple Inc., or WINDOWS PHONE® developed by Microsoft Corporation. Accordingly, operating systems executing the application 200 may include, but are not limited to, one of ANDROID®, IOS®, or WINDOWS PHONE®. In some examples, the application 200 may execute an operating system including, but not limited to, MICROSOFT WINDOWS® by Microsoft Corporation, MAC OS® by Apple, Inc., or Linux.

Figure 2A:
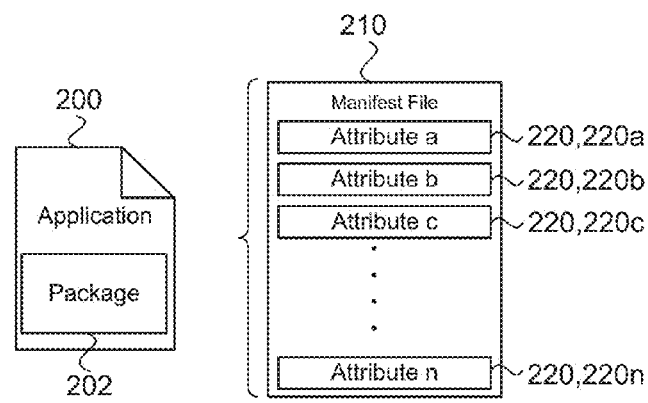
FIG. 2A is a schematic view of attributes associated with a software application.
Figure 2B:
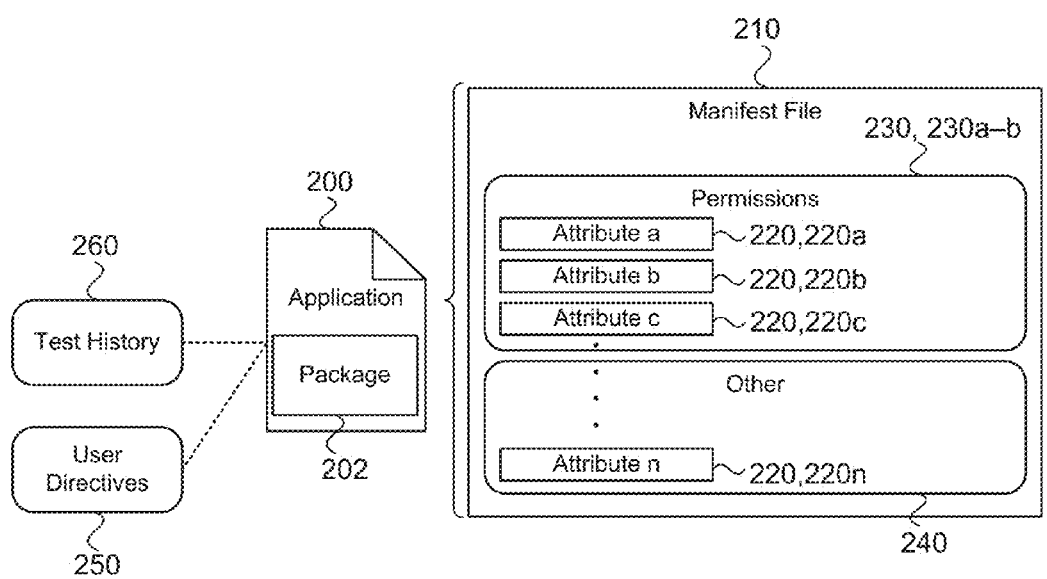
FIG. 2B is a schematic view of attributes associated with a software application classified as permissions or other attribute types.

Referring to FIGS. 2A and 2B, in some implementations, the application package 202 for the application 200 includes a manifest file 210 that contains a list of attributes 220, 220a-n associated with the application 200. In some implementations, the attributes 220 include at least one of build information, operating locality information, device hardware requirements, or device software requirements. The compatibility determiner 300 may use the attributes 220 for determining the test compatibility of the application 200 on the virtual devices 130 and on the physical devices 140. Moreover, the device selector 400 may select the test device 450 having a configuration compatible with the attributes 220 associated with the application 200.

Attributes 220 associated with build information may include one or more compiled instruction set architectures (ISA) compiled for producing at least a portion of the application 200. An ISA may include an instruction set for a compatible processing device (e.g., processor) intended to execute the application 200, a set of resources (e.g., registers and modes for addressing memory) accessible by the instructions of the instruction set, and a set of exceptions the processor generates in response to processing the instructions of the instruction set. In some examples, attributes 220 associated with build information include binaries indicating that the application 200 is compiled for physical devices 140 implementing processors compatible for executing reduced instruction set computing (RISC), such as Advanced RISC Machine (ARM) processors. Generally, ARM processors are associated with reduced costs, heat, and power use than typical x86 processors that generally run on desktop computers. Accordingly, physical devices 140 that are mobile, such as laptops 140a, tablets 140b, smart phones 140c, and wearable computing devices 140d (e.g., headsets and/or watches), are suitable candidates for implementing ARM processors due to their design requirements being indicative of at least one of lightweight, portable, and battery-powered. Moreover, the physical devices 140 may include ARM processors, ARM V7 processors. Microprocessor without Interlocked Pipeline States (TIPS) processors, and some x86 processors. Additionally or alternatively, the build information may include binaries indicating the application 200 is compiled for x86 processors which may include physical devices 140 that are stationary, such as desktop computers 140e.

In some implementations, attributes 220 associated with operating locality information may indicate one or more target regions (e.g., countries) intended to use the application 200. For instance, attributes 220 associated with operating locality information may indicate languages associated with the target regions supported by the application 200. Additionally, one or more of the attributes 220 may indicate localization information associated with the target regions such as, but not limited to, formats for dates, times, currency, or other relevant information associated with the target regions.

Attributes 220 associated with the device hardware requirements may indicate one or more hardware components required by the physical devices 140 to execute the application 200. In some examples, the device hardware requirements specify a compatible screen configuration associated with the application 200. The screen configuration may specify a screen size and a screen density compatible for the application 200. In these scenarios, when at least one of the attributes 220 specifies only one compatible screen configuration, the compatibility determiner 300 may filter out one or more of the physical devices 140a-n that do not support the compatible screen configuration, and therefore, determine the one or more of the physical devices 140 incompatible for testing the application 200. However, one or more of the attributes 220 may specify scaling and resizing parameters supporting multiple different screen configurations compatible for the application 200. In this way, a variety of the physical devices 140a-n having different screen configurations may support the application 200. One or more of the attributes 220 associated with the device hardware requirements may also include requirements for at least one of audio, Bluetooth, camera, infrared, location (e.g., Global Positioning System (GPS)), microphone, telephony, Near Field Communication (NEC), sensors (e.g., motion sensors, barometer, compass, gyroscope, light sensors, proximity sensors, step counter, touchscreen), universal serial bus (USB), or Wi-Fi required by the application 200.

In some examples, attributes 220 associated with the device software requirements indicate an operating system required for executing the application 200. For example, the operating system for executing the application 200 may include, but is not limited to, one of ANDROID®, IOS®, or WINDOWS PHONE®. Additionally, the device software requirements may indicate one or more software features used by the application 200 such as application widgets, device management, home screen, input method, or live wallpaper.

Referring to FIG. 2B, in some implementations, one or more of the attributes 220a-n are classified as permissions 230, 230a-b that prevent/grant access to one or more features required by the application 200. When a feature is required by the application 200, at least one of the physical devices 140 must be configured with the necessary device hardware and/or device software to support the required feature so that the application 200 operates correctly. The permissions 230 associated with the application 200 may be hardware-based permissions 230a and/or software-based permissions 230b. For example, the hardware-based permissions 230a prevent/grants access to a corresponding hardware feature used or required by the application 200. In some examples, hardware features used or required by the application 200 include at least one of the aforementioned device hardware requirements. Similarly, the software-based permissions 230b may prevent/grant access to a corresponding software feature used or required by the application 200. In some examples, the software features used or required by the application 200 include at least one of the aforementioned device software requirements. FIG. 2B shows the attributes 220a-c associated with the permissions 230, 230a-b and the remaining attributes 220n including other attribute types 240, such as one or more of the foregoing attributes 220 described above with reference to FIG. 2A. In some implementations, the compatibility determiner 300 determines that the virtual devices 130 are incompatible for testing the application 200 when the virtual devices 130 are incapable of emulating hardware-based permissions 230a required by the application 200.

Optionally, the application package 202 for the application 200 may be associated with user directives 250 from the user device 102. For example, the application tester 150 may receive a test request (e.g., user directive) 250 from the user device 102 to test the application 200 on a target device 130, 140. In some scenarios, the user device 102 provides the test request 250 concurrently with the application package 202. In other scenarios, the application tester 150 solicits the user device 102, via a testing inquiry 550 (FIGS. 5A and 5B), to provide the test request 250 in response to receiving the application package 202. As used herein, the target device 130, 140 refers to a particular one of the virtual devices 130 or a particular one of the physical device 140 that the user 102 specifies to execute the application 200 for testing performance and/or functionality of the application 200. Described in greater detail below with reference to FIGS. 5A and 5B, the compatibility determiner 300 may determine a test compatibility of the application 200 on the target device 130, 140 and the device selector 400 may accept or revoke the test request 250 based on the test compatibility.

In some examples, a test history 260 is associated with the application 200. For example, the test history 260 may include a history of test devices 450 (e.g., test virtual devices 450a and/or test physical devices 450b) that were previously selected by the device selector 400 for executing the application 200. The test history 260 may include test parameters that indicate crash reports of the previously selected test devices 450 and/or indicate how reliable the previously selected test devices 450 were when executing the application 200. The compatibility determiner 300 may use the test history 260 when determining the test compatibility of the application 200 and/or the device selector 400 may use the test history 260 when selecting the test device 450.

Referring to FIG. 3A-3D, in some implementations, the compatibility determiner 300 receives the application package 202 for the application 200 from the user device 102 to determine the test compatibility of the application 200 on the virtual devices 130, 130a-n and on the physical devices 140, 140a-n. The compatibility determiner 300 may include an extractor 310, an attribute determiner 314, an attribute classifier 316, and a compatibility analyzer 320. The compatibility determiner 300 may also optionally include a test history module 360 and a user directive module 350. The extractor 310 may extract the manifest file 210 from the application package 202 and the attribute determiner 314 may receive the manifest file 210 from the extractor 310 and determine the one or more attributes 220, 220a-n associated with the application 200 from the manifest file 210.

Figure 3A:
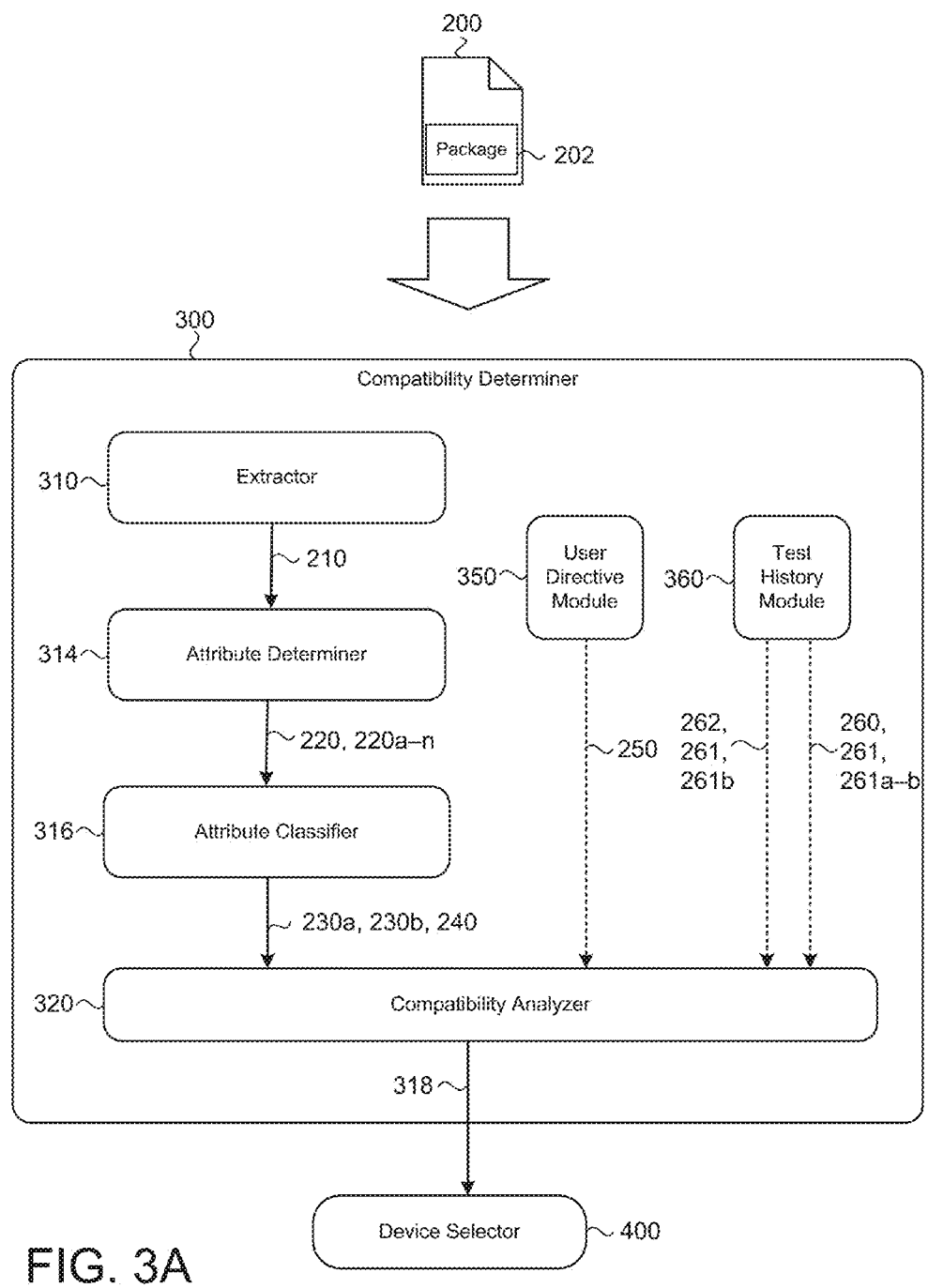
FIG. 3A is a schematic view of example components of a compatibility determiner of the system of FIG.
Figure 3B:
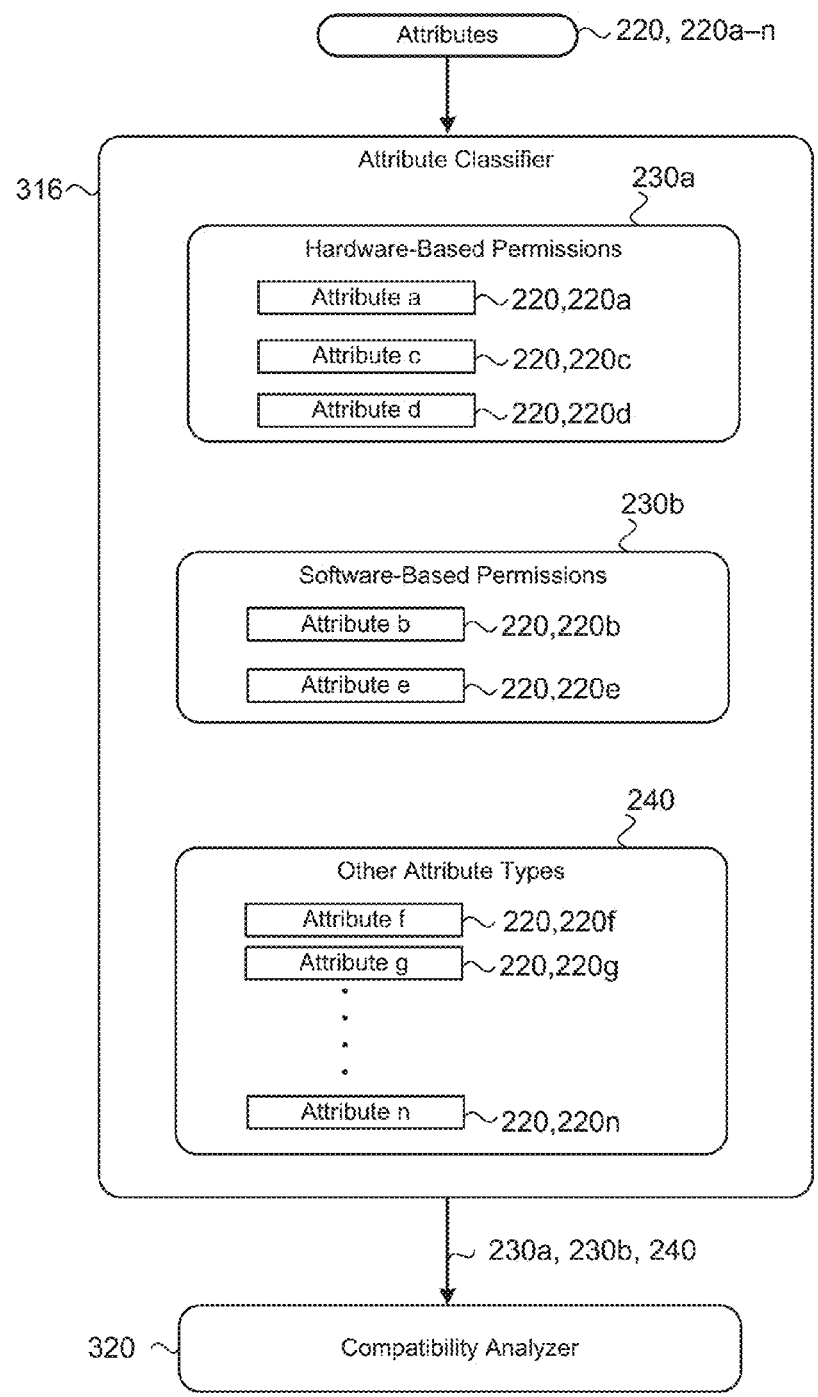
FIG. 3B is a schematic view of an attribute classifier classifying attributes associated with the software application of FIG. 1

In some examples, FIG. 3B shows the attribute classifier 316 classifying the one or more attributes 220, 220a-n as at least one of the hardware-based permissions 230a, the software-based permissions 230b, and/or the other attribute types 240. For example, the attribute classifier 316 classifies the attributes 220a, 220c, 220d as the hardware-based permissions 230a operative to prevent/grant access to corresponding ones of the hardware features used or required by the application 200. Similarly, the attribute classifier 316 classifies the attributes 220b, 220e as the software-based permissions 230b operative to prevent/grant access to the corresponding ones of the software features used or required by the application 200. In some implementations, the attributes 220 explicitly specify whether or not they include permissions 230a, 230b that are required by the application 200. Additionally, the attribute classifier 316 classifies the attributes 220f-n as the other attribute types 240. The other attribute types 240 associated with the application 200 may include at least one of the build information, the operating locality information, the device hardware requirements that are not protected by the hardware-based permissions 230a, or the device software requirements that are not protected by the software-based permissions 230b. The one or more attributes 220 may also include one or more software libraries associated with the application 200 that indicate at least one of the one or more features and/or the one or more permissions 230 associated with the application 200.

Figure 3C:
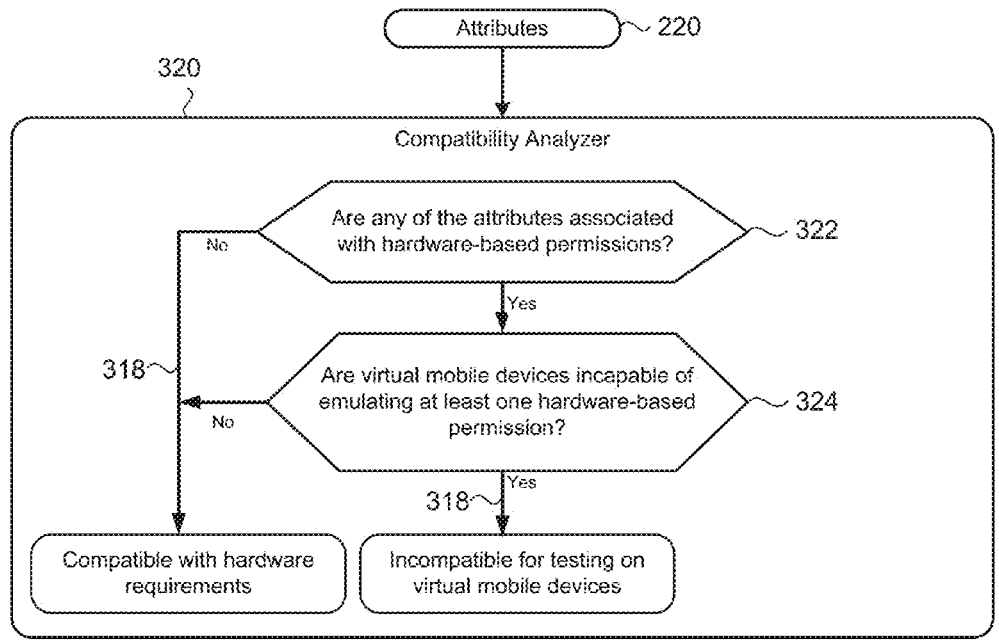
FIG. 3C is an example compatibility process for testing a software application on virtual devices.

In some examples, the compatibility analyzer 320 determines whether the application 200 is compatible on the virtual devices 130 based on one or more of the attributes 220 associated with the application 200. Referring to FIG. 3C, in some implementations, the compatibility analyzer 320 performs an example compatibility process for testing the application 200 on the virtual devices 130. At step 322, the compatibility analyzer 320 determines whether any of the attributes 220 are associated with the hardware-based permissions 230a. If none of the attributes 220 are associated with the hardware-based permissions 230a (e.g., step 322 is "No"), the compatibility analyzer 320 determines compatibility information 318 indicating that the virtual devices 130 are compatible with the device hardware requirements of the application 200. If, however, one or more of the attributes 220 are associated with one or more of the hardware-based permissions 230a (e.g., step 322 is "Yes"), the compatibility analyzer 320 determines, at step 324, whether the virtual devices 130 are incapable of emulating at least one of the hardware-based permissions 230a. If the virtual devices 130 are incapable of emulating at least one of the hardware-based permissions 230a (e.g., step 324 is "Yes"), the compatibility analyzer 320 determines compatibility information 318 indicating that, the application 200 is incompatible for testing on the virtual devices 130. For example, the virtual devices 130 may be incapable of emulating hardware-based permissions 230a corresponding to device hardware requirements of the application 200 such as, but not limited to, a camera, a location sensor (e.g., Global Positioning System (GPS)), a microphone, motion sensors, and/or a gyroscope. Accordingly, the device selector 400 can filter out all of the virtual devices 130 from consideration when selecting the test device 450.

Figure 3D:
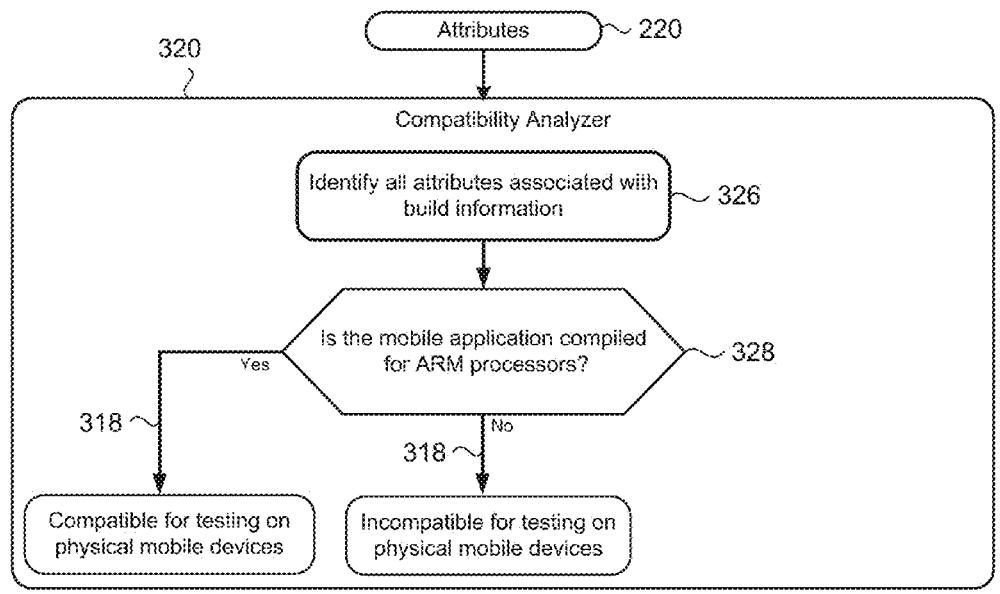
FIG. 3D is an example compatibility process for testing a software application on physical devices.

Referring to FIG. 3D, in some implementations, the compatibility analyzer 320 performs an example compatibility process for testing the application 200 on the physical devices 140. At step 326, the compatibility analyzer 320 identifies all of the attributes 220 associated with the build information for the application 200. These attributes 220 may be found under the other attribute types 240 classified by the attribute classifier 316. At step 328, the compatibility analyzer 320 determines if the application 200 is compiled for ARM processors or if the application 200 contains code compiled for ARM processors. For example, the compatibility analyzer 320 may determine whether any of the attributes 220 associated with the build information include binaries indicating that the application 200 is compiled for ARM processors. If the application 200 is compiled for the ARM processors (e.g., step 328 is "Yes"), the compatibility analyzer 320 determines compatibility information 318 indicating that the application 200 is compatible for testing on the physical devices 140 including mobile physical devices. If however, the application 200 is not compiled for the ARM processors (e.g., step 328 is "No"), the compatibility analyzer 320 determines the compatibility information 318 indicating that, the application 200 is incompatible for testing on the physical devices 140 including the mobile physical devices. Accordingly, the device selector 400 can filter out all of the physical devices 140 including the mobile physical devices from consideration when selecting the test device 450.

Referring to FIG. 3A, in some implementations, the test history module 360 extracts the test history 260 associated with the application 200 from the application package 202 and provides the test history 260 to the compatibility analyzer 320. The test history 260 may include test parameters 261 associated with the test devices 450 previously selected for executing the application 200. The test parameters 261 may indicate whether any of the previously selected test devices 450 executing the application 200 properly tested the application 200. For example, the test history 260 may indicate that one or more of the test virtual devices 450a previously selected for executing the application 200, properly tested the application 200 based on a comparison between test parameters 261a associated with the previously selected test virtual devices 450a and test parameters 261b associated with one or more of the test physical devices 450b previously selected for executing the application 200. Accordingly, the compatibility analyzer 320 may use the test history 260 when determining the test compatibility (e.g., compatibility information 318) of the application 200 on the virtual devices 130 and on the physical devices 140. Additionally or alternatively, the test history module 360 may also provide test history 260 indicative of reliability information 262 associated with a reliability of testing the application 200 on a previously selected one of the test physical devices 450b. For example, the reliability information 262 may indicate that the previously selected test physical device 450b is reliable for testing the application 200 based on the test parameters 261b associated with the previously selected test physical device 450b executing the application 200 during one or more previous tests. Accordingly, the compatibility analyzer 320 may use the reliability information 262 when determining the test compatibility (e.g., compatibility information 318) of the application 200 on the physical devices 140. In some implementations, the user directive module 350 provides the test request 250 from the user device 102 to the compatibility analyzer 320.

Figure 4A:
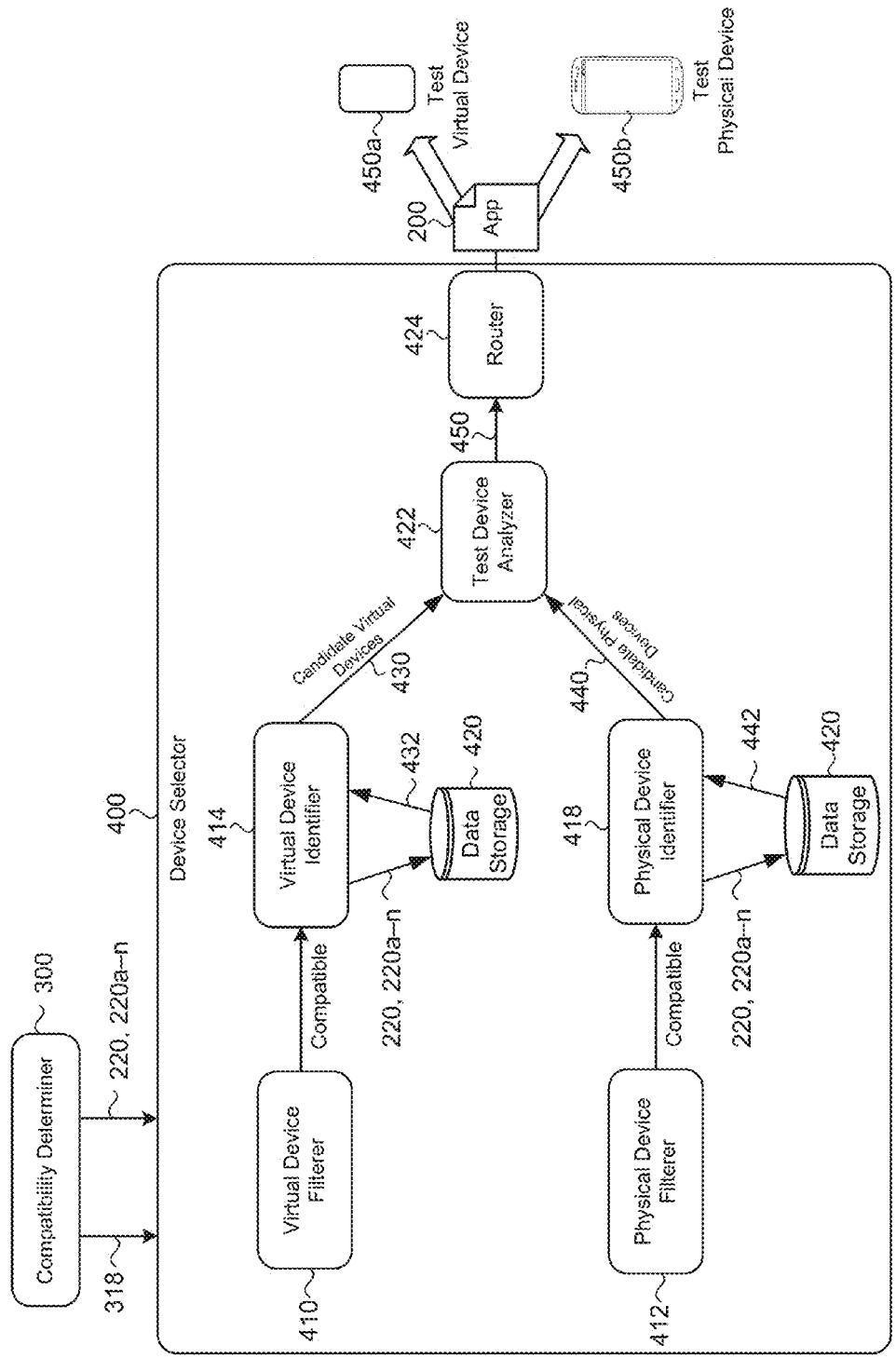
FIG. 4A is a schematic view of example components of a device selector of the system of FIG. 1.

Referring to FIG. 4A, in some implementations, the device selector 400 receives the compatibility information 318 and the attributes 220 associated with the application 200 from the compatibility determiner 300 and selects the test device 450 most suitable for executing the application 200 based on the compatibility information 318 and the attributes 220. The test device 450 selected by the device selector 400 may include the test virtual device 450a selected from the collection of virtual devices 130, 130a-n or the test physical device 450b selected from the collection of physical devices 140, 140a-n. The compatibility information 318 may indicate the test compatibility of the application 200 on the virtual devices 130 and on the physical devices 140. The compatibility information 318 may include whether the application 200 is compatible for testing on the virtual devices 130 and/or on the physical devices 140, the test history 260 (e.g., test parameters 261 and/or reliability information 262), or the user directives 250 from the user device 102.

In some configurations, the device selector 400 includes a virtual device filterer 410 that determines whether the application 200 is compatible for testing on the virtual devices 130 and a physical device filterer 412 that determines if the application 200 is compatible for testing on the physical devices 140. For example, the virtual device filterer 410 may obtain the compatibility information 318 determined by the compatibility process (FIG. 3C) for testing the application 200 on the virtual devices 130 and determine compatibility of the application 200 for testing on the virtual devices 130 when the virtual devices 130 are capable of emulating all of the hardware-based permissions 230a for the application 200. Similarly, the physical device filterer 412 may obtain the compatibility information 318 determined by the compatibility process (FIG. 3D) for testing the application 200 on the physical devices 140 and determine compatibility of the application 200 for testing on the physical devices 140 including physical mobile devices when the application 200 is compiled for ARM processors. In some implementations, the device selector 400 only selects the test physical device 450b as the test device 450 when the virtual device filterer 410 determines that the virtual devices 130 are incompatible for testing the application 200. In some implementations, the device selector 400 only selects the test virtual device 450a as the test device 450 when the physical device filterer 412 determines that the physical devices 140 are incompatible for testing the application 200. In other implementations, the device selector 400 rejects testing the application 200 when neither the virtual devices 130 nor the physical devices 140 are compatible for testing the application 200.

The device selector 400 may include a virtual device identifier 414 that identifies candidate ones of the virtual devices 430 for testing the application 200 when the virtual device filterer 410 determines that the application 200 is compatible for testing on the virtual devices 130. As used herein, the candidate ones of the virtual devices 430 refer to one or more of the virtual devices 130 capable of emulating physical devices having one or more of the device hardware, the device software, the build information, or the operating locality information compatible with the application 200. In some examples, the virtual device identifier 414 communicates with data storage hardware 420 for retrieving matching virtual device identifiers 432 using the attributes 220, 220a-n associated with the application 200. For instance, the virtual device identifier 414 may use the device identifiers 432 to obtain the candidate ones of the virtual devices 430 from a collection of the virtual devices 130.

The device selector 400 may also include a physical device identifier 418 that identifies candidate ones of the physical devices 440 for testing the application 200 when the physical device filterer 412 determines that the application 200 is compatible for testing on the physical devices 140. As used herein, the candidate ones of the physical devices 440 refer to one or more of the physical devices 140 having one or more of the device hardware, the device software, the build information, or the operating locality information compatible with the application 200. In some examples, the physical device identifier 418 communicates with data storage hardware 420 for retrieving matching physical device identifiers 442 using the attributes 220, 220a-n associated with the application 200. For instance, the physical device identifier 418 may use the device identifiers 442 to obtain the candidate ones of the physical devices 440 from a collection of the physical devices 140.

Figure 4B:
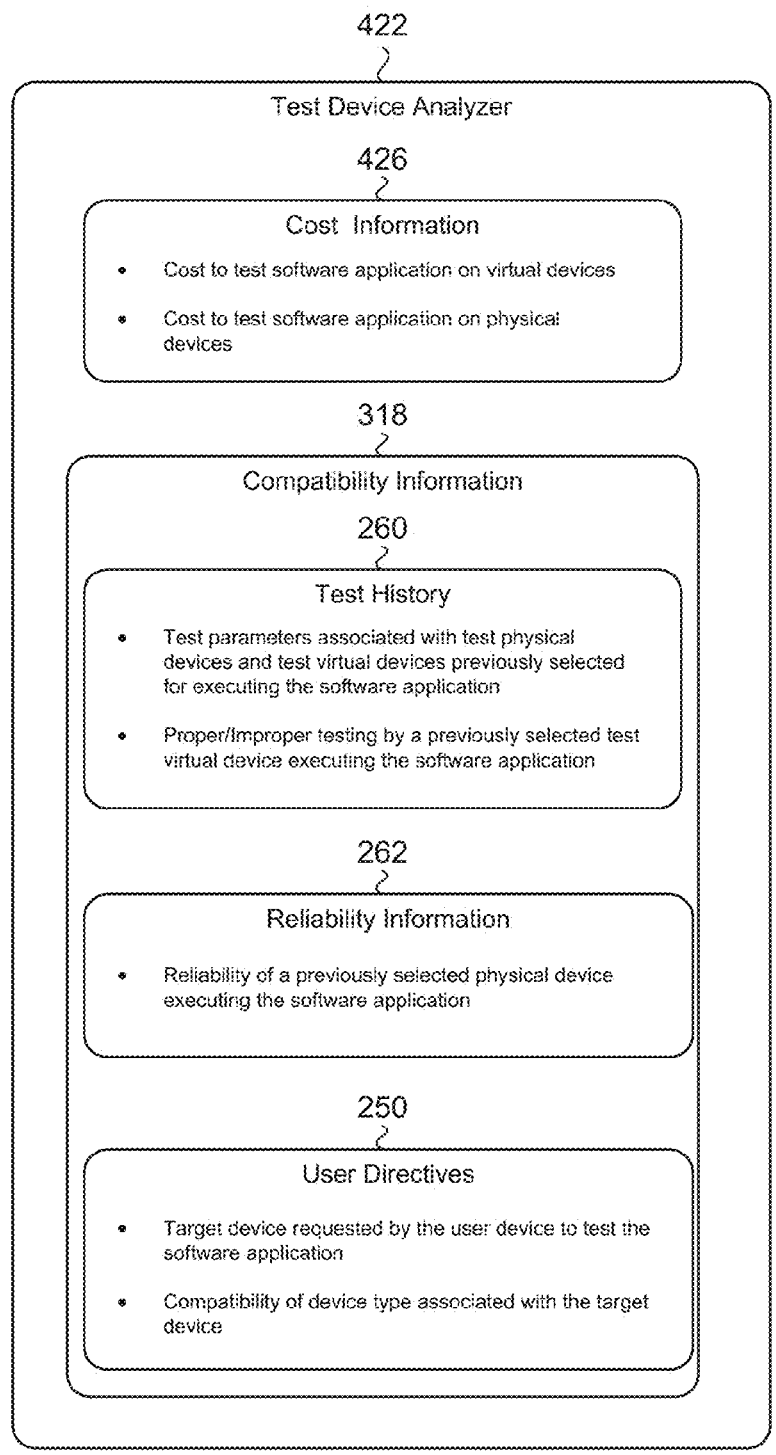
FIG. 4B is a schematic view of a test device analyzer analyzing cost information and compatibility information.

In some implementations, the device selector 400 includes a test device analyzer 422 for selecting the test device 450, 450a-b from the candidate ones of the virtual devices 430 or the candidate ones of the physical devices 440 based on the compatibility information 318. Reaming to FIG. 4B, in some implementations, the device analyzer 422 uses a rule-based approach to select the test device 450 most suitable for testing the application 200. In some examples, the device analyzer 422 applies precedence to the test virtual device 450a or the test physical device 450b based on at least one of cost information 426 and the compatibility information 318. The compatibility information 318 may include at least one of the test history 260, the reliability information 262, and the user directives 250 from the user device 102.

The cost information 426 may provide a cost to test the application 200 on the virtual devices 130 and a cost to test the application 200 on the physical devices 140. As used herein, the costs refer to rates charged to the user/developer 10 for testing the application 200 on respective ones of the virtual devices 130 and the physical devices 140. The cost/rate for testing the application 200 on the virtual devices 130 is generally lower than the cost/rate for testing the application 200 on the physical devices 140. In some implementations, when the application 200 is compatible for testing on both the virtual devices 130 and on the physical devices 140, the test device analyzer 422 allocates testing the application 200 on one of the candidate ones of the virtual devices 430 associated with lower testing costs and availability. However, at least one of the test history 260, the reliability information 262, or the user directives 250 may indicate that one or more of the candidate ones of the physical device 440 are more suitable for testing the application 200.

The test history 260 may provide the test parameters 261a associated with the previously selected test virtual device 450a and the test parameters 261b associated with the previously selected test physical device 450b. In some implementations, emulating a feature of the application 200 on the test virtual device 450a results in timing behavior that is different than a timing behavior of the test physical device 450b to execute the application 200. Variances in the timing behaviors between the test physical device 450b and the test virtual device 450a may be an indicator that the test virtual device 450a did not properly test the application 200 during a previous test. In some examples, the test device analyzer 422 compares the test parameters 261a, 261b provided by the test history 260 to determine whether the test virtual device 450a previously selected by the device selector 400 properly tested the application 200. In some implementations, the test history 260 additionally or alternatively includes the test parameters 261a, 261b associated with the test virtual device 450a and the test physical device 450b executing a different software application having substantially similar attributes 220 as the software application 200 to provide an inference of how the test devices 450a, 450b will execute the application 200.

The reliability information 262 may indicate the reliability of testing the application 200 on the test physical device 450b previously selected for executing the application 200 during a previous test. For example, the reliability information 262 may indicate that the previously selected test physical device 450b was reliable when executing the application 200 compared to the test virtual device 450a previously selected by the device selector 400 for executing the application 200. Accordingly, the test device analyzer 422 may use the reliability information 262 when determining whether selecting the test physical device 450b is suitable for testing the application 200.

In some implementations, the test device analyzer 422 considers the user directives 250 from the user device 102. The user directives 250 may include the test request from the user device 102 to test the application 200 on the target device 130, 140 including one of the test virtual device 450a or the test physical device 450b. In some examples, the user directives 250 explicitly indicate a particular one of the test virtual devices 450a or the test physical devices 450b. In other examples, the user directives 250 specify the device type being associated with one of the virtual devices 130 or the physical devices 140 and the device analyzer 422 selects the test device 450 most suitable for executing the application 200. Provided that the target device 130, 140 is compatible for testing the application 200, the test device analyzer 422 may provide a preference toward selecting the target device 130, 140 as the test device 450 for testing the application 200. In some implementations, the device analyzer 422 revokes the test request 250 to test the application 200 on the target device 130, 140 when the device type (e.g., virtual or physical) associated with the target device is incompatible for executing the application 200 (e.g., as determined by the virtual device filterer 410 or the physical device filterer 412). In these implementations, the test device analyzer 422 may instead select the test device 450 from the candidate ones of the devices 430 or 440 associated with a device type that is different than the device type of the target device 130, 140. In some implementations, the device analyzer 422 revokes the test request 250 to test the application 200 on the target device 130, 140 when the application 200 is incompatible for testing on the target device 130, 140 (e.g., the target device 130, 140 does not include one of the candidate ones of the virtual devices 430 or the candidate ones of the physical devices 440). In these implementations, the device analyzer 422 may instead select the test device 450 the candidate ones of the virtual devices 130 or the candidate ones of the physical devices 140 associated with the same device type as the target device 130, 140.

Referring to FIG. 4A, in some implementations, the device selector 400 includes a router 424 that receives the test device 450 selected by the device analyzer 422. The router 424 may route the application 200 to the test device 450 including one of the test virtual device 450a or the test physical device 450b. The test physical device 450b may include a selected one of the physical devices 140a-n including, but not limited to, laptops 140a, tablets 140b, smart phones 140c, and wearable computing devices (e.g., headsets and/or watches) 140d.

Figure 5A:
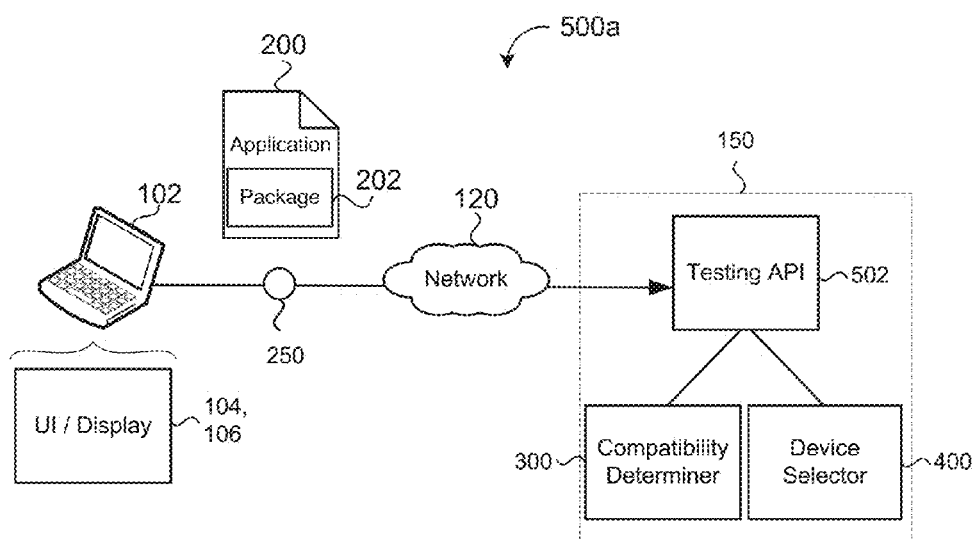
FIGS. 5A and 5B show schematic views of an example testing application programming interface receiving an application package for a software application and a test request from a user device.
Figure 5B:
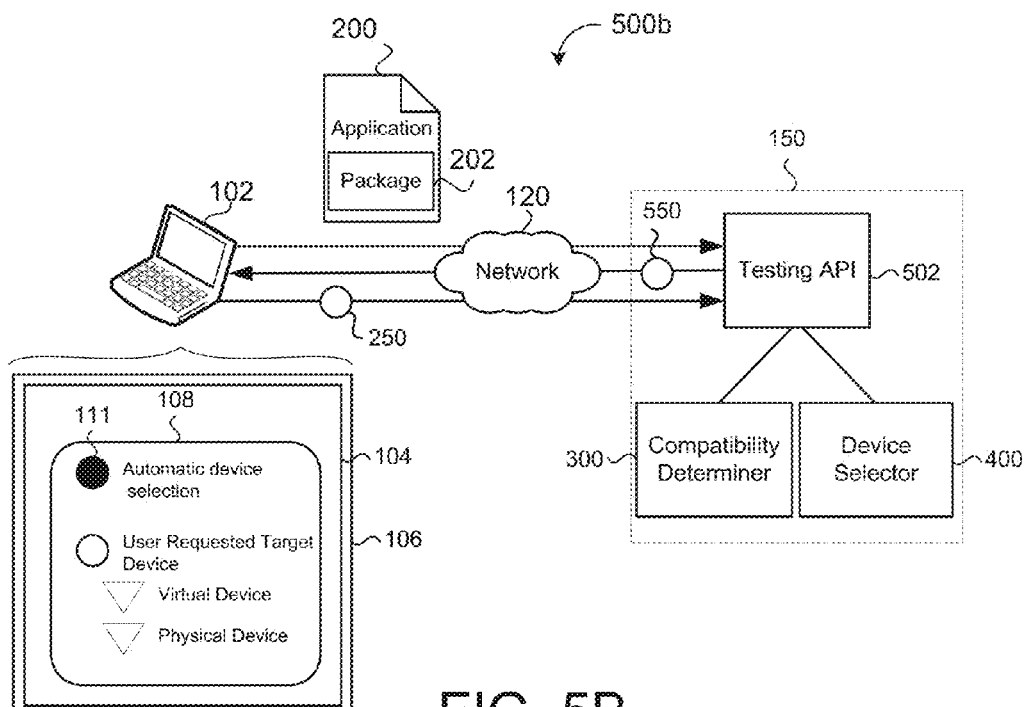

Referring to FIGS. 5A and 5B, in some implementations, schematic views 500a and 500b show the application tester 150 executing a testing Application Programming Interface 502 (herein after testing API) for receiving the test request 250 from the user device 102 (FIG. 5A) and for transmitting a testing inquiry 550 to the user device 102 and subsequently receiving the test request 250 from the user device 102 (FIG. 5B).

Referring to FIG. 5A, the testing API 502 receives the test request 250 concurrently with the application package 202 for the application 200 from the user device 102. In some examples, the user device 102 executes a user interface (UI) 104 on a display 106 to provide the test request 250 to the testing API 502. The test request 250 may include indicate the target device 130, 140 that the user device 102 specifies to execute the application 200 for testing performance and/or functionality of the application 200. The testing API 502 may provide the test request 250 to the compatibility determiner 300 for determining the test compatibility of the application 200 on the target device 130, 140 and/or to the device selector 400 for determining whether or not the target device 130, 140 will be selected as the test device 450 for executing the application 200. For example, the device selector 400 may accept the test request 250 or revoke the test request 250. When the device selector 400 revokes the test request 250 due to the target device 130, 140 being incompatible or less preferable for testing, the device selector 400 may select the test device 450 associated with a device type different than the device type of the target device 130, 140.

Referring to FIG. 5B, the testing API 502 transmits the testing inquiry 550 to the user device 102 in response to receiving the application package 202 for the application 200 from the user device 102. The testing inquiry 550 may solicit the user device 102 to provide the testing API 502 with the test request 250. In some implementations, the user device 102 executes the UI 104 on the display 106 to display the testing inquiry 550 received from the testing API 502 and to provide the test request 250 to the testing API 502. In some examples, the testing inquiry 550 received by the user device 102 causes the UI 104 to display an interactive graphic 108 on the display 106 that is operative to receive a user selection 111. FIG. 5B shows the user interface 104 displaying the interactive graphic 108 operative to receive the user selection 111 for selecting one of an automatic device type or a user requested device type. The automatic device type enables the application tester 150 to select either one of the test virtual device 450a or the test physical device 450b based on the test compatibility with the application 200. The user requested device type permits the user device 102, via the 104, to request the testing API 502 to test the application 200 on the target device 130, 140 including one of the virtual device 130 type or the physical device 140 type. In some examples, the UI 104 displays pull-down menus for selecting the particular test virtual device 450a or the particular test physical device 450b. FIG. 5B shows the automatic device type receiving the user selection 111. Accordingly, the testing API 502 receives the test request 250 from the user device 102 enabling the device selector 400 to select the test virtual device 450a or the test physical device 450b most suitable for executing the application 200 based on the test compatibility determined by the compatibility determiner 300.

Figure 6A:
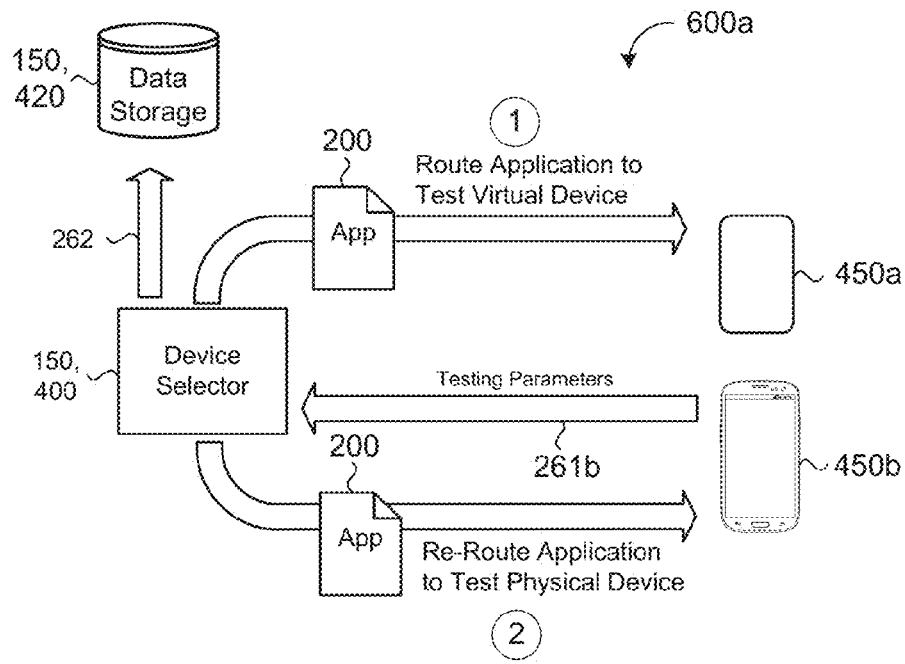
FIGS. 6A and 6B show schematic views of an example device selector routing a software application to a test virtual device and a test physical device.
Figure 6B:
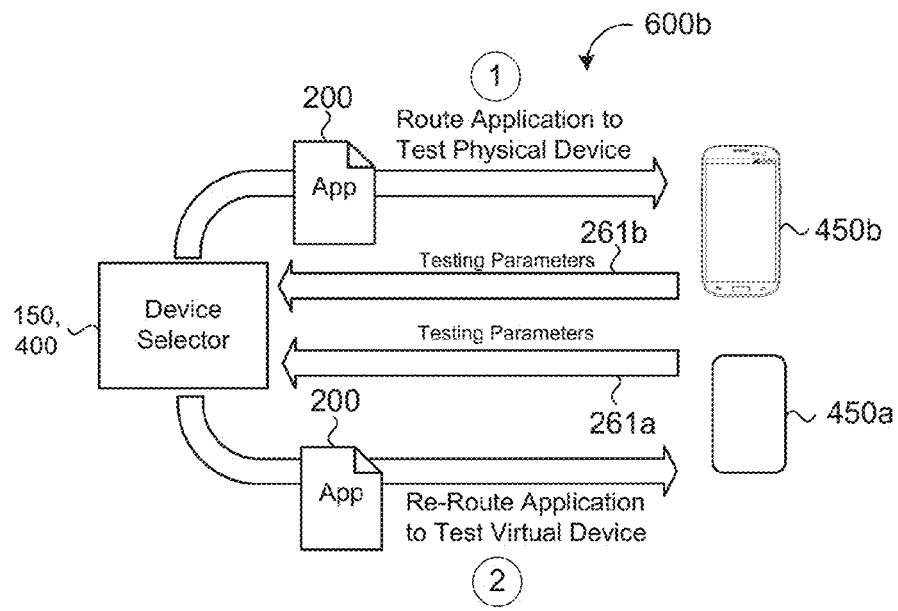

Referring to FIGS. 6A and 6B, in some implementations, schematic views 600a and 600b show the device selector 400 initially routing the application 200 to the test virtual device 450a (FIG. 6A) and initially routing the application 200 to the test physical device 450b (FIG. 6B). Referring to FIG. 6A, the device selector 400 selects the test virtual device 450a as the test device 450 and routes the application 200 to the test virtual device 450a, thereby causing the test virtual device 450a to execute the application 200. In some implementations, when the application 200 is also compatible for testing on the physical devices 140 and after executing the application 200 on the test virtual device 450a, the device selector 400 selects the test physical device 450b as the test device 450 and re-routes the application 200 to the test physical device 450b, thereby causing the test physical device 450b to execute the application 200. After the test physical device 450b executes the application 200, the test physical device 450b may provide the test parameters 261b associated with the test physical device 450b to the device selector 400. In some examples, the device selector 400 determines the reliability information 262 associated with executing the application 200 on the test physical device 450b based on the test parameters 261b. The device selector 400 may store the reliability information 262 in the data storage hardware 420 in communication with the device selector 400 and the compatibility determiner 300 for use during subsequent compatibility testing of the application 200.

Referring to FIG. 6B, the device selector 400 selects the test physical device 450b as the test device 450 and routes the application 200 to the test physical device 450b, thereby causing the test physical device 450b to execute the application 200. After the test physical device 450b executes the application 200, the test physical device 450b may provide its test parameters 262b to the device selector 400. In some implementations, when the application 200 is also compatible for testing on the virtual devices 130 and after executing the application 200 on the test physical device 450b, the device selector 400 selects the test virtual device 450a as the test device 450 and re-routes the application 200 to the test virtual device 450a, thereby causing the test virtual device 450a to execute the application 200. The test virtual device 450a may also provide its test parameters 261a to the device selector 400 after executing the application 200. In some implementations, the device selector 400 compares the test parameters 261a, 261b to determine whether the test virtual device 450a properly tested the application 200. In some implementations, when the test virtual device 450a properly tests the application 200, the device selector 400 selects the test virtual device 450a as the test device 450 for a subsequent test of the application 200. Accordingly, the subsequent test may test the application 200 on the test virtual device 450a to reduce costs for testing the application 200 without degrading performance and/or functionality of the test.

Figure 7:
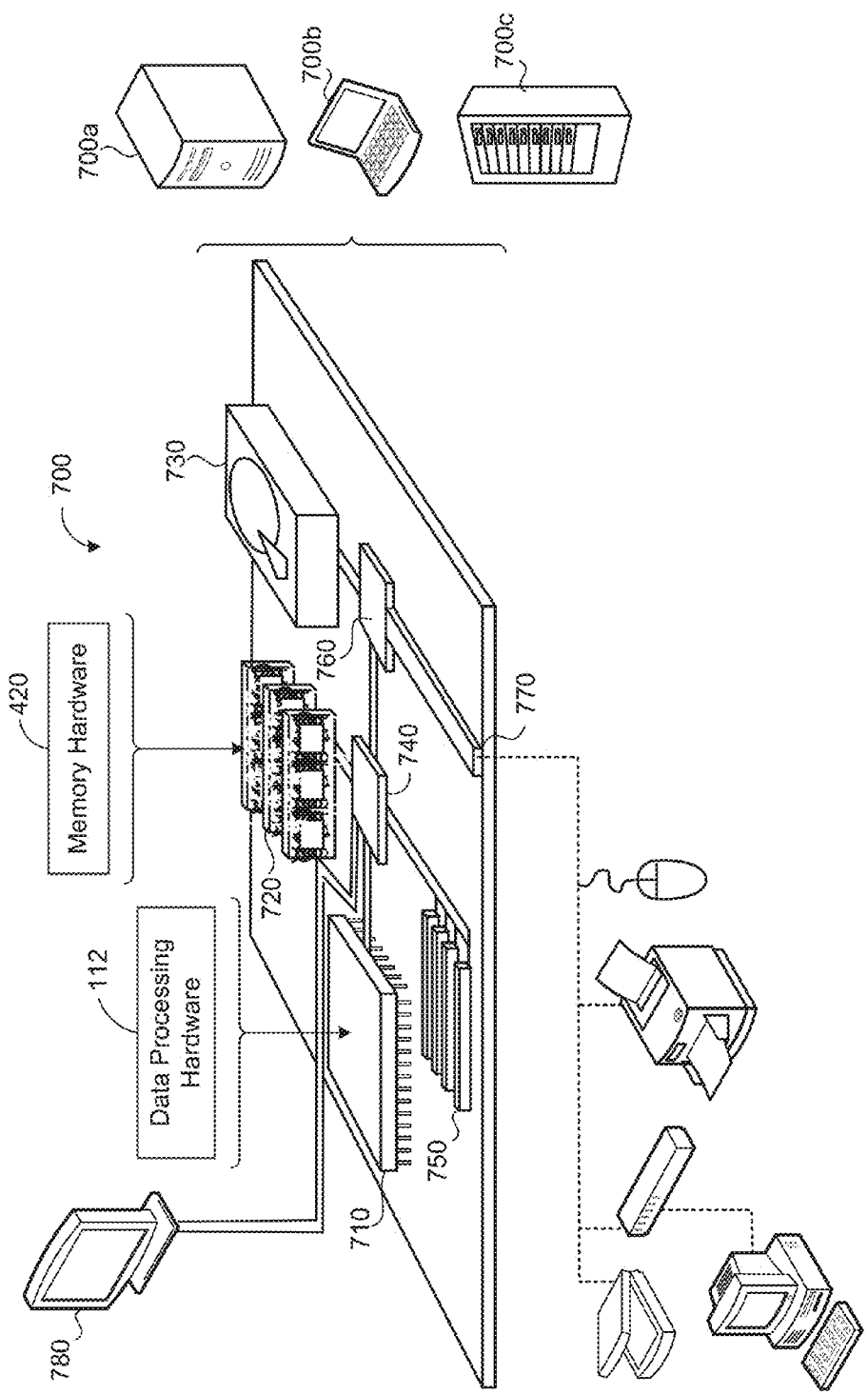
FIG. 7 is a schematic view of an example computing device executing a compatibility determiner and a device selector of the system of FIG. 1.

FIG. 7 is a schematic view of an example computing device 700 that may be used to implement the systems and methods described in this document, such as the computing resource 112. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710 (i.e., data processing hardware), memory 720, a storage device 730, a high-speed interface/controller 740 connecting to the memory 720 and high-speed expansion ports 750, and a low speed interface/controller 760 connecting to a low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a GUI on an external input/output device, such as a display 780 coupled to a high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 includes hardware that stores information non-transitorily within the computing device 700. The memory 720 may be a computer-readable medium, a volatile memory unit(s), or non-volatile memory unit(s). The non-transitory memory 720 may be physical devices (e.g. hardware) used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

In some implementations, the computing device 700 implementing the computing resource 112 (executing on the data processing hardware 710) is in communication with memory hardware 420 (e.g., in the memory 720). The computing resource 112 (executing on the data processing device 710) receives the application package 202 for the software application 200 and determines the test compatibility of the software application 200 on the virtual devices 130 and on the physical devices 140 based on the application package. In some examples, the data processing hardware 112 selects the test device 450 based on the test compatibility of the software application 200. For example, the test device 450 includes one of the test virtual device 450a or the test physical device 450b. In some configurations, the data processing hardware 112 routes the software application 200 to the test device 450, causing the test device 450 to execute the software application 200.

A software application (i.e., a software resource 110s) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110hm may be physical devices used to store programs (e.g., sequences of instructions) or data (e.g., program state information) on a temporary or permanent basis for use by a computing device 110hc. The non-transitory memory hardware 110hm may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 8:
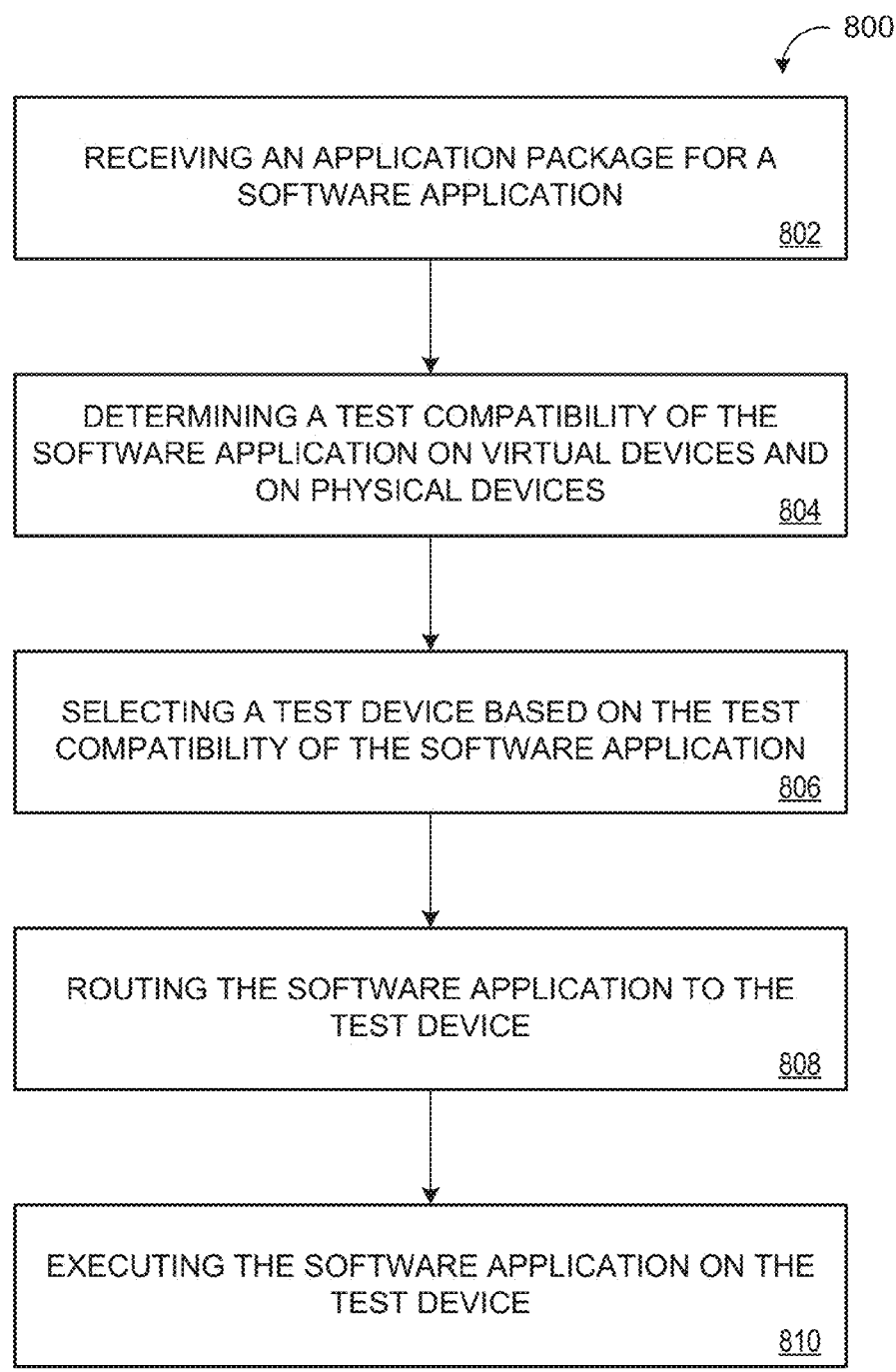
FIG. 8 is a flowchart of an example method for selecting a test device for executing a software application.

FIG. 8 is a flowchart of an example method 800 executed by the computing device 700 of FIG. 7 for selecting a test device 450 for executing a software application 200. The flowchart starts at operation 802 where the data processing hardware 112 (executing on the computing device 700) receives an application package 202 for the software application 200. At operation 804, the data processing hardware 112 determines a test compatibility of the software application 200 on virtual devices 130 and on physical devices 140 based on the application package 202. At operation 806, the data processing hardware 112 selects the test device 450 based on the test compatibility of the software application 200. The test device 450 includes one of a test virtual device 450a or a test physical device 450b. At operation 808, the data processing hardware 112 routes the software application 200 to the test device 450. At operation 810, the test device 450 executes the software application 200.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The terra "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at data processing hardware, an application package for a software application;
   determining, by the data processing hardware, a test compatibility of the software application on virtual devices and on physical devices based on the application package;
   selecting, by the data processing hardware, a test device based on the test compatibility of the software application and a history of test devices previously selected for executing the software application, the test device comprising one of a test virtual device or a test physical device;
   routing the software application to the test device; and
   executing the software application on the test device.

2. The method of claim 1, wherein selecting the test device is based on one or more permissions associated with features required by the software application.

3. The method of claim 2, further comprising, when the virtual devices are incapable of emulating at least one of the one or more permissions associated with features required by the software application, selecting, by the data processing hardware, the test physical device as the test device.

4. The method of claim 1, wherein selecting the test device is based on a cost to test the software application on the virtual devices and a cost to test the software application on the physical devices.

5. The method of claim 1, wherein selecting the test device is based on one or more instruction set architectures compiled for producing at least a portion of the software application.

6. The method of claim 1, further comprising:
   extracting, by the data processing hardware, a manifest file from the application package;
   determining, by the data processing hardware, attributes of the software application, the attributes comprising at least one of build information, operating locality information, device hardware requirements, or device software requirements; and
   determining, by the data processing hardware, the test compatibility of the software application based on the attributes of the software application.

7. The method of claim 1, wherein determining the test compatibility of the software application comprises:
   determining, by the data processing hardware, software libraries associated with the software application; and
   determining, by the data processing hardware, one or more features and/or one or more permissions associated with the software application based on the software libraries.

8. The method of claim 1, wherein the physical devices comprise at least one of desktop computers, laptops, tablets, smart phones, and wearable computing devices.

9. A method comprising:
   receiving, at data processing hardware, an application package for a software application;
   determining, by the data processing hardware, a test compatibility of the software application on virtual devices and on physical devices based on the application package;
   selecting, by the data processing hardware, a test device based on the test compatibility of the software application, the test device comprising one of a test virtual device or a test physical device;
   routing the software application to the test device; and
   executing the software application on the test device,
   wherein selecting the test device comprises:
     when the software application is compatible for testing on the virtual devices:
       selecting the test virtual device from a collection of the virtual devices, the test virtual device emulating a physical device having device hardware compatible with device hardware requirements of the software application; and
     when the software application is compatible for testing on physical devices:
       selecting a test physical device from a collection of the physical devices, the test physical device having device hardware compatible with the device hardware requirements.

10. A method comprising:
    receiving, at data processing hardware, an application package for a software application;

determining, by the data processing hardware, a test compatibility of the software application on virtual devices and on physical devices based on the application package;
selecting, by the data processing hardware, a test device based on the test compatibility of the software application, the test device comprising one of a test virtual device or a test physical device;
routing the software application to the test device; and
executing the software application on the test device,
wherein selecting the test device comprises:
receiving, at the data processing hardware, a test request from a user device to test the software application on a target device, the target device comprising a device type associated with the virtual devices or the physical devices;
determining, at the data processing hardware, whether the software application is incompatible for testing on the target device based on the device type;
when the software application is incompatible for testing on the target device:
selecting the test device from a collection of test devices associated with a device type different than the device type of the target device, the test device having device hardware compatible with device hardware requirements of the software application; and
when the software application is compatible for testing on the device type associated with the target device:
selecting the test device from a collection of test devices associated with the same device type as the target device, the test device having device hardware compatible with device hardware requirements of the software application.

11. A method comprising:
receiving, at data processing hardware, an application package for a software application;
determining, by the data processing hardware, a test compatibility of the software application on virtual devices and on physical devices based on the application package;
selecting, by the data processing hardware, a test device based on the test compatibility of the software application, the test device comprising one of a test virtual device or a test physical device;
routing the software application to the test device;
executing the software application on the test device; and
when the test physical device is selected as the test device and after executing the software application on the test device:
when the software application is compatible for testing on the virtual devices:
re-routing the software application to the test virtual device;
executing the software application on the test virtual device; and
comparing, by the data processing hardware, test parameters associated with the executing of the software application on the test virtual device and on the test physical device.

12. The method of claim 11, further comprising, when the test virtual device properly tests the software application based on the comparing of the test parameters, selecting, by the data processing hardware, the test virtual device as the test device for a subsequent test of the software application.

13. A method comprising:
receiving, at data processing hardware, an application package for a software application;
determining, by the data processing hardware, a test compatibility of the software application on virtual devices and on physical devices based on the application package;
selecting, by the data processing hardware, a test device based on the test compatibility of the software application, the test device comprising one of a test virtual device or a test physical device;
routing the software application to the test device;
executing the software application on the test device; and
when the test virtual device is selected as the test device and after executing the software application on the test device:
when the software application is compatible for testing on the physical devices:
re-routing the software application to the test physical device;
executing the software application on the test physical device;
determining, by the data processing hardware, reliability information associated with executing the software application on the test physical device; and
storing the reliability information in memory hardware in communication with the data processing hardware for use during subsequent compatibility testing of the software application.

14. A method comprising:
receiving, at data processing hardware, an application package for a software application;
determining, by the data processing hardware, a test compatibility of the software application on virtual devices and on physical devices based on the application package;
transmitting a testing inquiry from the data processing hardware to a user device in communication with the data processing hardware after receiving the application package for the software application, the testing inquiry causing a user interface executing on the user device to display an interactive graphic configured to receive a user selection, the interactive graphic comprising at least one of:
an automatic device type selection that enables the data processing hardware to select either one of a test virtual device or a test physical device based on the test compatibility; or
a user requested device type selection that permits the user device to request the data processing hardware to test the software application on a target device, the target device comprising the virtual device type or the physical device type;
receiving, at the data processing hardware, a device type selection based on the at least one of the automatic device type selection or the user requested device type selection of the interactive graphic;
selecting, by the data processing hardware, a test device based on the device type selection, the test device comprising one of the test virtual device or the test physical device;
routing the software application to the test device; and
executing the software application on the test device.

15. A system comprising:
data processing hardware; and
memory hardware in communication with the data processing hardware, the memory hardware storing instructions that when executed on the data processing hardware cause the data processing hardware to perform operations comprising:
    receiving an application package for a software application;
    determining a test compatibility of the software application on virtual devices and on physical devices based on the application package;
    selecting a test device based on the test compatibility of the software application and a history of test devices previously selected for executing the software application, the test device comprising one of a test virtual device or a test physical device;
    routing the software application to the test device; and
    causing execution of the software application on the test device.

16. The system of claim 15, wherein the data processing hardware selects the test device based on one or more permissions associated with one or more features required by the software application.

17. The system of claim 16, wherein the data processing hardware, when the virtual devices are incapable of emulating at least one of the one or more permissions associated with the one or more features required by the software application, selects the test physical device as the test device.

18. The system of claim 15, wherein the data processing hardware selects the test device based on a cost to test the software application on the virtual devices and a cost to test the software application on the physical devices.

19. The system of claim 15, wherein the data processing hardware selects the test device based on one or more instruction set architectures compiled for producing at least a portion of the software application.

20. The system of claim 15, wherein the data processing hardware:
    extracts a manifest file from the application package;
    determines attributes of the software application, the attributes comprising at least one of build information, operating locality information, device hardware requirements, or device software requirements; and
    determines the test compatibility of the software application based on the attributes of the software application.

21. The system of claim 15, wherein the data processing hardware, when determining the test compatibility of the software application:
    determines software libraries associated with the software application; and
    determines one or more features and/or one or more permissions associated with the software application based on the software libraries.

22. The system of claim 15, wherein the data processing hardware, when determining the test compatibility of the software application on the virtual devices and on the physical devices, determines the test compatibility of the software application on the physical devices comprising at least one of desktop computers, laptops, tablets, smart phones, and wearable computing devices.

23. A system comprising:
    data processing hardware; and
    memory hardware in communication with the data processing hardware, the memory hardware storing instructions that when executed on the data processing hardware cause the data processing hardware to perform operations comprising:
        receiving an application package for a software application;
        determining a test compatibility of the software application on virtual devices and on physical devices based on the application package;
        selecting a test device based on the test compatibility of the software application, the test device comprising one of a test virtual device or a test physical device;
        routing the software application to the test device; and
        causing execution of the software application on the test device,
    wherein selecting the test device comprises:
        when the software application is compatible for testing on the virtual devices:
            selecting the test virtual device from a collection of the virtual devices, the test virtual device emulating a physical device having device hardware compatible with device hardware requirements of the software application; and
        when the software application is compatible for testing on physical devices:
            selecting a test physical device from a collection of the physical devices, the test physical device having device hardware compatible with the device hardware requirements.

24. A system comprising:
data processing hardware; and
memory hardware in communication with the data processing hardware, the memory hardware storing instructions that when executed on the data processing hardware cause the data processing hardware to perform operations comprising:
    receiving an application package for a software application;
    determining a test compatibility of the software application on virtual devices and on physical devices based on the application package;
    selecting a test device based on the test compatibility of the software application, the test device comprising one of a test virtual device or a test physical device;
    routing the software application to the test device; and
    causing execution of the software application on the test device,
wherein selecting the test device comprises:
    receiving a test request from a user device to test the software application on a target device, the target device comprising a device type associated with the virtual devices or the physical devices;
    determining whether the software application is incompatible for testing on the target device based on the device type;
    when the software application is incompatible for testing on the target device:
        selecting the test device from a collection of test devices associated with a device type different than the device type of the target device, the test device having device hardware compatible with device hardware requirements of the software application; and
    when the software application is compatible for testing on the device type associated with the target device:
        selecting the test device from a collection of test devices associated with the same device type as the target device, the test device having device hardware compatible with device hardware requirements of the software application.

25. A system comprising:
data processing hardware; and
memory hardware in communication with the data processing hardware, the memory hardware storing instructions that when executed on the data processing hardware cause the data processing hardware to perform operations comprising:
  receiving an application package for a software application;
  determining a test compatibility of the software application on virtual devices and on physical devices based on the application package;
  selecting a test device based on the test compatibility of the software application, the test device comprising one of a test virtual device or a test physical device;
  routing the software application to the test device;
  causing execution of the software application on the test device; and
  when the software application is compatible for testing on the virtual devices:
    re-routing the software application to the test virtual device;
    executing the software application on the test virtual device; and
    comparing test parameters associated with the executing of the software application on the test virtual device and on the test physical device.

26. The system of claim 25, wherein the data processing hardware, when the test virtual device properly tests the software application based on the comparing of the test parameters, selects the test virtual device as the test device for a subsequent test of the software application.

27. A system comprising:
data processing hardware; and
memory hardware in communication with the data processing hardware, the memory hardware storing instructions that when executed on the data processing hardware cause the data processing hardware to perform operations comprising:
  receiving an application package for a software application;
  determining a test compatibility of the software application on virtual devices and on physical devices based on the application package;
  selecting a test device based on the test compatibility of the software application, the test device comprising one of a test virtual device or a test physical device;
  routing the software application to the test device;
  causing execution of the software application on the test device; and
  when the test virtual device is selected as the test device and after executing the software application on the test device:
    when the software application is compatible for testing on the physical devices:
      re-routing the software application to the test physical device;
      executing the software application on the test physical device;
      determining reliability information associated with executing the software application on the test physical device; and
      storing the reliability information in memory hardware in communication with the data processing hardware for use during subsequent compatibility testing of the software application.

28. The system of claim 27, wherein the data processing hardware, when executing the instructions stored on the memory hardware:
  transmits a testing inquiry to a user device in communication with the testing application program interface after receiving the application package for the software application, the testing inquiry causing a user interface executing on the user device to display an interactive graphic configured to receive a user selection, the interactive graphic comprising at least one of:
    an automatic device type selection that enables the device selector to select either one of the test virtual device or the test physical device based on the test compatibility; or
    a user requested device type selection that permits the user device to request the testing application program interface to test the software application on a target device, the target device comprising a virtual device type or a physical device type.

* * * * *